United States Patent Office 3,547,872
Patented Dec. 15, 1970

3,547,872
SATURATED POLYESTERS CONTAINING CYCLIC EPOXIDES AND NUCLEATING AGENTS
Klaus Weissermel, Kelkheim, Taunus, Rudolf Uebe, Eschborn, Taunus, and Horst Pfister and Ludwig Brinkmann, Frankfurt am Main, Germany, assignors to Farbwerke Hoechst Aktiengesellschaft vormals Meister Lucius & Bruning, Frankfurt am Main, Germany, a corporation of Germany
No Drawing. Filed Mar. 14, 1969, Ser. No. 807,422
Claims priority, application Germany, Apr. 3, 1968, 1,769,097
Int. Cl. C08g 51/04
U.S. Cl. 260—40                16 Claims

ABSTRACT OF THE DISCLOSURE

Thermoplastically processible moulding compositions of linear saturated polyesters, cyclic epoxides and inert inorganic solid substances that yield shaped articles free from flash even under relatively high injection pressures.

---

The present invention relates to thermoplastic moulding compositions containing polyesters.

It has been proposed to process polyesters of aromatic dicarboxylic acids and appropriate aliphatic diols into shaped articles in the thermoplastic range under determined conditions. When injection moulding such compositions, however, phenomena appear that render it difficult to obtain high-quality products in an economical manner. Such phenomena are above all flash formation, thermal degradation of the polyester mass in the injection moulding machine and the insufficient speed of crystallization of the pure polyester material in the mould. Flash and thermal degradation cannot be prevented by modifying the processing conditions in the injection machine. Polyethylene terephthalate has, for example, a high crystallite melting point and can therefore be processed thermoplastically only above 250° C. To fill the mould completely a corresponding post pressure must be applied which, however, generally leads to the undesirable flash formation. In order that the test specimens may crystallize as rapidly as possible and to the largest possible extent, the mould is heated. It is advantageous to use crystallization promoting substances which are added to the polyester, for example, in the form of finely ground minerals.

It has been described in U.S. Patent Application. Ser. No. 762,980 to add epoxides of the following fromula

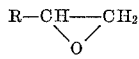

in which R stands for an alkyl, cycloalkyl, aralkyl or aryl group which may be substituted by an ether group and contains at least one epoxide group, to moulding compositions based on polyesters to improve their properties.

The present invention provides a thermoplastic moulding composition of excellent properties, comprising a mixture of (a) a linear saturated polyester of an aromatic dicarboxylic acid and optionally a small amount of a saturated aliphatic dicarboxylic acid with a saturated aliphatic or cycloaliphatic diol,
(b) 0.05 to 2%, preferably 0.1 to 0.5%, calculated on the weight of the polyester, of an inert inorganic solid substance, for example a silicate, e.g. talc or kaolin, a metal oxide, e.g. titanium dioxide, antimony oxide or magnesium oxide, or an alkali metal salt or alkaline earth metal salt, e.g. a carbonate or fluoride, and
(c) 0.05 to 2%, preferably 0.2 to 1%, calculated on the weight of the polyester, of a cyclic epoxide of the following formula

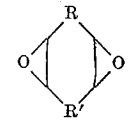

in which R and R' each stand for an alkylene, cycloalkylene, aralkylene or arylene group, and R and R' may be linked directly or via one or more carbon atoms to form a bicyclic or polycyclic ring, and R and/or R' may contain epoxy groups.

The cyclic epoxides to be used in accordance with the invention completely suppress flash formation even under relatively high injection pressures whereas, for example, a polyethylene terephthalate having a relative specific viscosity of 1.38 dl./g., which has been prepared only with a crystallization promoting substance shows pronounced flash formation under a post pressure of 70 atmospheres gage. Simultaneously the speed of crystallization is increased. Increased speeds of processing can consequently be obtained.

Furthermore, by the addition of epoxides degradation of the polyester mass is prevented and the relative specific viscosity can even be increased, for example, from 1.38 dl./g. to 1.50 dl./g. in the injection moulding of shaped articles.

As linear saturated polyester polyethylene terephthalate is advantageously used. It is also possible to use other polyesters, for example polycyclohexane-(1,4)-dimethylol terephthalate. There may also be used modified polyethylene terephthalate which contains, in addition to terephthalic acid, also other aromatic or aliphatic dicarboxylic acids as basic units, for example, isophthalic acid, naphthalene-dicarboxylic acids-(2,6) or adipic acid. It is likewise possible to use modified polyethylene terephthalates which contain, in addition to ethylene glycol, also other aliphatic diols, for example, neopentyl glycol or butanediol-(1,4) as the alcoholic component. Polyesters of oxycarboxylic acids may also be used. The polyesters advantageously have a reduced specific viscosity within the range of from 0.6 to 2.0 dl./g., preferably 0.9 to 1.6 dl./g., determined in a 1% solution in a mixture of phenol and tetrachlorethane (60:40) at 25° C. Polyesters having a reduced viscosity of 1.1 to 1.5 dl./g. are particularly suitable.

As inorganic crystallization promoting substances talc, kaolin, titanium dioxide, aluminum oxide and calcium carbonate may be used. Examples of suitable cyclic epoxides are cyclooctadiene - (1,5) - diepoxide, cyclododecatriene - (1,5,9) - triepoxide, 1,2,5,6-diepoxy-cyclododecene-9, bicycloheptadiene diepoxide. In principle there are two possibilities to add the additives to the polycondensate to obtain the above effects in the injection moulding of shaped articles. The crystallization promoting substance may be added separately before, during or after the polycondensation. By proceeding in this manner, a uniformly nucleated granular polyester is obtained. The epoxide compound is then admixed either as such or while dissolved in a solvent which is subsequently eliminated. The polyester mass may then be directly injection moulded into shaped articles or the epoxide may be incorporated into the polyester mass by regranulation. By so proceeding step by step, a particularly homogeneous distribution of the additives is obtained.

It is also possible to apply the inorganic crystallization promoting substance together with the epoxide to the granular polyester by rolling and then to render the product suitable for processing by melting it on an extruder and subsequently granulating it.

All operations must be carried out with exclusion from moisture to prevent hydrolysis of the polyester and the epoxide compound. The polyester moulding composition advantageously contains less than 0.01% by weight water. If it is intended to obtain a rapid crystallization in the mould and consequently a short injection cycle, the mould must be kept at a temperature of at least 100° C. Mould temperatures within the range of from 120 to 150° C. are most favorable.

The following examples serve to illustrate the invention, but are not intended to limit it.

EXAMPLES

In each case, 1.5 kilograms granular polyethylene terephthalate containing 0.4% by weight talc and having a moisture content of 0.008% by weight and a relative specific viscosity of 1.38 dl./g. were rolled at 50° C. for 1 hour with one of the following epoxides:

(A) cyclooctadiene-(1,5)-diepoxide
(B) bicyclo[2,2,1]heptadiene-diepoxide.

Epoxide compounds (A) and (B) were used in three different concentrations. After rolling with the epoxide compounds, the granular product was homogenized at 275° C. on an extruder (residence time in the extruder 1.5 mintes, 36 revolutions of screw per minute), extruded and granulated in water. The polyester mass was then thoroughly dried in 180° C. in vacuo and subsequently injection moulded into plates 60 x 60 x 2 mm. Each charge was subjected to the same conditions: temperature of cylinder 270° C./260° C./260° C., temperature of mould 140° C., injection time 15 seconds, injection pressure 140 atmospheres gage. The moulding time and the post pressure were varied in each case.

The results ascertained are indicated in the following Table 1. For a comparison, the values obtained on granular polyester without epoxide are given in the following Table 2.

of an inert inorganic solid substance of a particle size below 5μ, and
(c) 0.05 to 2% by weight, calculated on the polyester, of a cyclic epoxide of the following formula

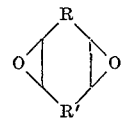

in which R and R' each stand for an alkylene, cycloalkylene aralkylene or arylene group, and R and R' may be linked directly or via one or more carbon atoms to form a bicyclic or polycyclic ring, and R and R' may contain epoxy groups.

2. A thermoplastic moulding composition as claimed in claim 1 wherein the linear saturated polyester is polyethylene glycol terephthalate.

3. A thermoplastic moulding composition as claimed in claim 1 wherein the linear saturated polyester is polycyclohexane-(1,4)-dimethylol terephthalate.

4. A thermoplastic moulding composition as claimed in claim 1 wherein the linear saturated polyester contains, in addition to terephthalic acid, also other aromatic or aliphatic dicarboxylic acids as the acid component.

5. A thermoplastic moulding composition as claimed in claim 4 wherein the linear saturated polyester contains, in addition to terephthalic acid, also other aromatic or aliphatic dicarboxylic acids selected from the group consisting of isophthalic acid, naphthalene-dicarboxylic acid-(2,6) and adipic acid as the acid component.

6. A thermoplastic moulding composition as claimed in claim 1 wherein the linear saturated polyester contains, in addition to ethylene glycol, also other aliphatic diols as the diol component.

7. A thermoplastic moulding composition as claimed in claim 6 wherein the linear saturated polyester contains,

TABLE 1

| Epoxide | Amount by weight | Specific visocisity dl/g. | | | Post pressure, atmospheres gage | Flash * under variable post pressure | Epoxide amount, percent by weight | Density at different moulding times | |
|---|---|---|---|---|---|---|---|---|---|
| | | Starting polyester | After incorporating A, B, C, by granulation | After injection moulding | | | | Sec. | d |
| A | 0.2 0.4 0.8 | 1.38 | 1.25 1.30 1.42 | 1.17 1.36 1.49 | 70, 100, 140__ Up to 140____ | None, none, weak___ None_____ | 0.4 | 2 15 30 60 | 1.372 1.373 1.373 1.374 |
| B | 0.2 0.4 0.8 | 1.38 | 1.30 1.43 1.48 | 1.39 1.59 | 70, 100, 140__ Up to 140___ | None, none, weak___ None_____ | 0.4 | 2 15 30 60 | 1.372 1.373 1.373 1.375 |

* Moulding time 15 seconds.

TABLE 2.—COMPARISON: POLYESTER FREE FROM EPOXIDE

| Specific viscosity | | Density at different moulding times | | Flash under post pressure (atmospheres gage |
|---|---|---|---|---|
| Before injection moulding | After injection moulding | Sec. | d | |
| 1.38 | 1.08 | 2 15 30 45 60 | 1.374 1.375 1.375 1.375 1.375 | 60, flash formation. 140, very pronounced. |

What is claimed is:
1. Thermoplastic moulding compositions comprising a mixture of
(a) a linear saturated polyester of an aromatic dicarboxylic acid and optionally a small amount of an aliphatic dicarboxylic acid with a saturated aliphatic or cycloaliphatic diol,
(b) 0.05 to 2% by weight, calculated on the polyester, in addition to ethylene glycol, also other diols selected from the group consisting of neopentyl glycol or butanediol-(1,4) as the diol component.

8. A thermoplastic moulding composition as claimed in claim 1 wherein the linear saturated polyester contains, in addition to terephthalic acid, also other oxycarboxylic acids as the acid component.

9. A thermoplastic moulding composition as claimed in claim 1 wherein the thermoplastic moulding composition has a reduced specific viscosity within the range of from 0.6 to 2.0 dl./g., determined in a 1% solution in a mixture of phenol and tetrachlorethane (60:40) at 25° C.

10. A thermoplastic moulding composition as claimed in claim 1, wherein the linear saturated polyester has a reduced specific viscosity within the range of from 0.9 to 1.6 dl./g., determined in a 1% solution in a mixture of phenol and tetrachlorethane (60:40) at 25° C.

11. A thermoplastic moulding composition as claimed in claim 1 wherein the linear saturated polyester has a reduced specific viscosity within the range of from 1.1 to 1.5 dl./g. determined in a 1% solution in a mixture of phenol and tetrachlorethane (60:40) at 25° C.

12. A thermoplastic moulding composition as claimed in claim 1 wherein the cyclic epoxide is added in an amount within the range of from 0.2 to 1.0% by weight calculated on the polyester.

13. A thermoplastic moulding composition as claimed in claim 1 wherein the cyclic epoxide is a compound selected from the group consisting of cyclooctadiene-(1,5)-diepoxide, cyclododecatriene-(1,5,9)-triepoxide, 1,2,5,6-diepoxy-cyclododecene-(9), bicycloheptadiene - diepoxide and dicyclopentadiene-diepoxide.

14. A thermoplastic moulding composition as claimed in claim 1 wherein an inert inorganic solid substance in an amount within the range of from 0.1 to 0.5% by weight is added.

15. A thermoplastic moulding composition as claimed in claim 1 wherein the inert inorganic solid substance is a compound selected from the group consisting of talc, kaolin, titanium dioxide, antimony trioxide, magnesium oxide, or a compound selected from the group consisting of alkali metal and alkaline earth metal carbonates and fluorides.

16. A shaped article made from the moulding composition of claim 1.

References Cited

UNITED STATES PATENTS

| | | | |
|---|---|---|---|
| 2,998,408 | 8/1961 | Zoetbrood | 260—75(Ep)UX |
| 3,372,143 | 3/1968 | Terada et al. | 260—75(Ep)X |
| 3,402,141 | 9/1968 | Matthies et al. | 260—40 |
| 3,479,318 | 11/1969 | Jackson et al. | 260—40 |

FOREIGN PATENTS

| | | | |
|---|---|---|---|
| 954,110 | 4/1964 | Great Britain | 260—835 |

MORRIS LIEBMAN, Primary Examiner

L. T. JACOBS, Assistant Examiner

U.S. Cl. X.R.

260—75